TUNABLE FILTER

Filed March 26, 1956

INVENTOR
GERARD L. ZOMBER
BY Ernest Fanwick
ATTORNEY

United States Patent Office 2,924,782
Patented Feb. 9, 1960

2,924,782

TUNABLE FILTER

Gerard L. Zomber, Wyckoff, N.J.

Application March 26, 1956, Serial No. 573,723
3 Claims. (Cl. 330—109)

Figure 1:
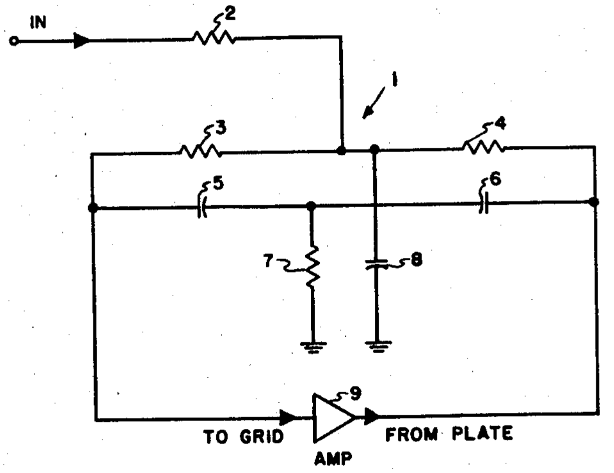

This invention relates to tunable filters and, more particularly, to stable high-Q networks, tunable over a range of audio-frequencies.

In the electrical communication art, it quite often becomes desirable to pass a narrow band of frequencies and to reject frequencies outside of this narrow band. Sharply selected frequency filters in the past have usually employed combinations of inductance, capacitance and resistance to secure such a desirable frequency characteristic. At relatively low frequencies, as for example audio-frequencies, the design of such filters has been complicated by the fact that the inductive elements become so large as to be physically inconvenient and economically undesirable.

In an attempt to eliminate this difficulty, filters have been designed utilizing resistance and capacitance elements only, but these have proved relatively unsatisfactory since their cutoff points were poorly defined.

Improved results have been secured in filter networks without inductive elements by employing a twin-T network in the feedback loop of an amplifier in such a manner that there is substantially no attenuation at the null frequency of the network, the attenuation increasing rapidly on either side of the center frequency due to the rise in feedback voltage which the network transmits.

It is also known that for maximum-Q, a twin-T network must feed into as high an impedance as possible. However, when one end of such network is used for the signal input, the relatively low impedance of the coupling resistance and the generator impedance, shunt the output of the network. This results in a great loss of Q which is detrimental to the performance of the circuit, especially when the center frequency is detuned from the point of best network symmetry.

One of the objects of this invention, therefore, is to provide means for obtaining a very narrow audio-frequency band-pass filter having a high degree of attenuation at nearby unwanted frequencies.

Another object of this invention is to provide an improved tunable network, especially adapted for use at low frequencies, which employs no inductive elements and which is degenerative.

A further object of this invention is to provide a tunable T feedback circuit in which stable high-Q selectivity is obtained over a broad range of audio-frequencies.

Still a further object of this invention is to provide a center-fed T network, greatly reducing the response of an amplifier circuit to noise and transient signals.

One of the features of this invention is a tunable audio-frequency filter composed of resistors and capacitors and a negative feedback amplifier which is especially suited for use in the audio-frequency spectrum.

Another feature of this invention is the use of a center-fed T network, coupled between the plate and grid of the electron tube in a negative feedback amplifier circuit. The use of a variable resistance in the cathode of the amplifier tube controls the gain and adjusts for the desired Q while a second rheostat, comprising the shunt resistance of the twin-T network, determines the frequency of this selective circuit.

Figure 2:
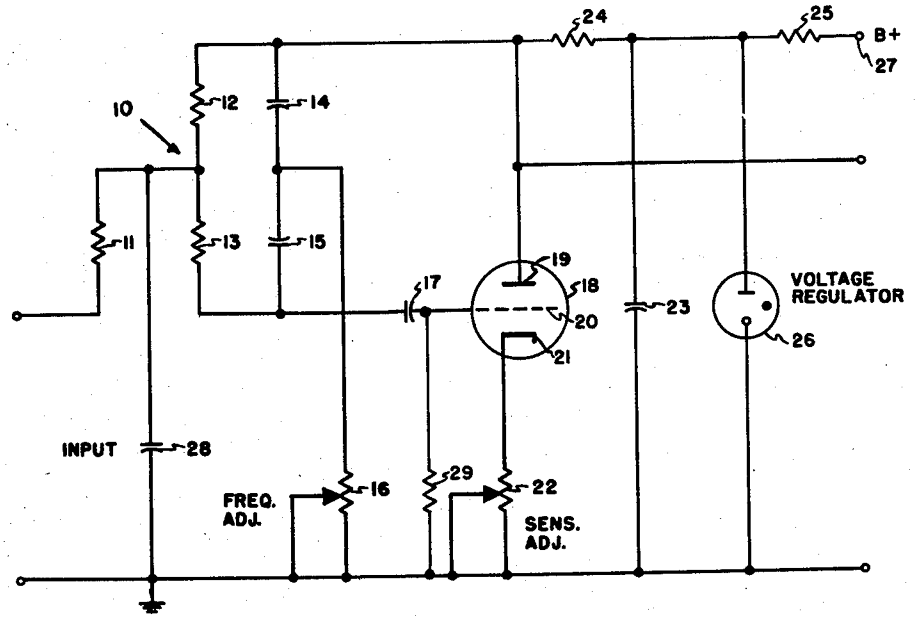

The above-mentioned and other objects and features of this invention, and the manner of attaining them, will become more apparent by reference to the following description taken in conjunction with the accompanying drawings, in which:

Fig. 1 is a schematic illustration, partly in block form, of a T network and feedback amplifier in accordance with the provisions of my invention, and Fig. 2 is a schematic circuit diagram of one embodiment of the stable tunable high-Q filter network and feedback amplifier in accordance with the principles of my invention.

Referring to Fig. 1 of the drawing, a schematic diagram, partly in block form, of a tunable filter network, in accordance with my invention is therein shown to comprise a twin-T network 1 in which an input signal is coupled to the midpoint thereof through a coupling resistor 2. The midpoint or center is the low impedance point of the twin-T network and, obviously, the signal may be coupled to the point common to the resistors 3 and 4 as shown, or to the point common to capacitors 5 and 6.

The twin-T network has two branches, one comprising series resistors 3 and 4, together with shunt capacitor 8, and the other branch comprising series capacitors 5 and 6, together with shunt resistor 7. One side of the twin-T network 1 is coupled to the amplifier 9 whose output is, in part, fed back to the twin-T network 1.

Referring to the schematic circuit diagram of Fig. 2, one embodiment of a tunable filter, in accordance with the principles of my invention is therein shown. The input signal from a generator (not shown) is coupled through coupling resistance 11 to a low impedance point of a twin-T network 10, comprising series resistances 12 and 13, shunt capacitor 28 and series capacitors 14 and 15, and variable shunt resistance 16. One side of the twin-T network 10 is coupled through coupling capacitor 17 to the grid 20 of the amplifier's electron discharge device 18. The usual grid leak resistance 29 is, of course, provided. The output of the amplifier tube 18 is coupled from the plate 19 to an output terminal and to the other side of the twin-T network 10 to form the feedback portion of this invention. A variable resistance 22 is coupled between the cathode and ground to adjust the gain of the circuit. A voltage regulator tube 26 is provided as a regulator, and plate voltage is provided for the voltage regulator tube and the amplifier tube through voltage dropping resistors 25 and 24, respectively.

The characteristic of the twin-T network is such that a relatively large feedback voltage is supplied from the plate circuit of vacuum tube 18 to its grid circuit at all frequencies except the critical one for which the network is adjusted. Tube 18 should preferably have a high transconductance characteristic in order to have the network feed as high an impedance as possible. As a result, the full amplification of vacuum tube 18 is realized only at this critical frequency, and the transmission of the system as a whole is substantially reduced at frequencies below and above the critical one.

The twin-T filter network is coupled in a negative feed-back circuit, and, thus, the frequency characteristics of this circuit as a whole peaks sharply at some frequency within the range controlled by the variable resistance 16. The components of the twin-T input circuit form an RC integrating network, which greatly reduces any response to noise and transients.

As previously stated, it has long been recognized that for a maximum-Q, a twin-T network must feed into as high an impedance as possible. However, if the side of the twin-T network, coupled to the grid of the discharge tube, is used as a signal input, the relatively low impedance of a coupling resistance 11, plus the impedance of the generator, would shunt the output of the twin-T network. The resultant loss of Q is detrimental to the performance of the circuit, particularly when the center frequency is detuned from the point of best symmetry. I have found that this loss of Q can be substantially reduced by feeding the network at the center or low impedance point. At the same time, a high degree of stability is obtained due to integration of the input signal.

It is well known that oscillations will occur in all phase shift networks whenever too much gain is applied for a given amount of feedback. When the phase shift introduced by the twin-T network of this invention is other than zero above and below the center frequency, the selective amplifier stage oscillates if operated at too high a gain level. The gain of the amplifier stage is controlled by adjusting variable resistor 22 for the desired Q. The sensitivity control resistance 22 adjusts the gain of the circuit by varying the degree of cathode degeneration. As the desired frequency is set by adjusting variable resistance 16, the sensitivity adjustment 22 is set to provide the proper bandwidth. The center frequency is, of course, affected slightly by the adjustment of resistance 22 so that several adjustments back and forth between the two variable resistances must be made before the desired center frequency and frequency-spread are obtained. It should be obvious that, if the gain of the circuit is adjusted so that the circuit oscillates, it is possible to utilize the input signal as a synchronizing signal.

It is, of course, also apparent that variations in the plate supply could raise the plate voltage of amplifier tube 18 sufficiently to cause instability and start oscillations. Therefore, in order to prevent this form of instability, it is desirable that the input plate supply be regulated; thus, voltage regulator 27 is utilized, or alternatively a regulated power supply may be utilized.

I have found that, with the circuit of this invention, selectivity over a two to one range of frequencies is obtainable with stable Q values of better than 100.

It should be clearly understood that alternate amplifier circuits and alternate means for adjusting the frequency and gain of this circuit could be utilized without departing from the spirit of my invention. For example, a pentode discharge device could be utilized in the amplifier and the screen grid bias adjusted to vary the gain of the network or the capacitive shunt impedance instead of the resistive shunt impedance on the twin-T network, could be varied to change the center frequency tuning of the circuit.

While I have described above the principles of my invention in connection with specific apparatus, it is to be clearly understood that this description is made by way of example only and not as a limitation to the scope of my invention as set forth in the objects thereof and in the accompanying claims.

I claim:

1. A filter circuit comprising a twin-T network, said filter circuit including a first branch having two resistive elements connected in series by a conductor and a first shunt connection comprising a capacitive element having one plate thereof connected to a point of said conductor between said two resistive elements and the other plate thereof connected to ground, a second branch comprising two capacitive elements connected together in series and a second shunt connection including a resistive element connected between said two capacitive elements and ground, an amplifier circuit including an electron discharge device comprising a cathode, grid electrode and anode, means for connecting together one end of said two series resistors, one end of said two series capacitive elements and the grid electrode of said discharge device, means for connecting together the other end of said two series resistors, the other end of said two series capacitive elements and the plate of said discharge device, and means for coupling an input signal between said point of said conductor and ground.

2. A filter circuit comprising a twin-T network, said filter circuit including a first branch having two resistive elements connected in series by a conductor and a first shunt connection comprising a capacitive element having one plate thereof connected to a point of said conductor between said two resistive elements and the other plate thereof connected to ground, a second branch comprising two capacitive elements connected together in series and a second shunt connection including a resistive element connected between said two capacitive elements and ground, an amplifier circuit having input and output portions, means for connecting together one end of said two series resistors, one end of said two series capacitive elements and said input portion of said amplifier circuit, means for connecting together the other end of said two series resistors, the other end of said two series capacitive elements and the output portion of said amplifier circuit, and means for coupling an input signal between said point of said conductor and ground.

3. A filter circuit comprising a twin-T network, an amplifier circuit having an input portion, a negative feedback portion and an output portion, said negative feedback portion including a first branch having two resistive elements connected in series by a conductor and a first shunt connection comprising a capacitive element having one plate thereof connected to a point of said conductor between said two resistive elements and the other plate thereof connected to ground, a second branch comprising two capacitive elements connected together in series and a second shunt connection including a resistive element connected between said two capacitive elements and ground, means for connecting together one end of said two series resistors, one end of said two series capacitive elements and said input portion of said amplifier circuit, means for connecting together the other end of said two series resistors, the other end of said two series capacitive elements and the output portion of said amplifier circuit, and means for coupling an input signal between said point of said conductor and ground.

References Cited in the file of this patent

UNITED STATES PATENTS

| | | |
|---|---|---|
| 2,173,427 | Scott | Sept. 19, 1939 |
| 2,689,161 | Marchand et al. | Sept. 14, 1954 |

OTHER REFERENCES

Text, 1949, "Waveforms," by Chance et al., Radiation Lab. Series No. 19, pages 120, 121.